US012559324B2

(12) United States Patent
Pinillos

(10) Patent No.: US 12,559,324 B2
(45) Date of Patent: Feb. 24, 2026

(54) DISTRIBUTION SYSTEM FOR AN ITEM OF EQUIPMENT FOR TREATMENT OF SOLID MATERIAL AND ITEM OF EQUIPMENT FOR TREATMENT OF SOLID MATERIAL

(71) Applicant: L'Air Liquide, Societe Anonyme pour l'Etude et l'Exploitation des Procedes Georges Claude, Paris (FR)

(72) Inventor: Joseluis Pinillos, Alcala de Guadai (ES)

(73) Assignee: L'Air Liquide, Société Anonyme pour l'Etude et l'Exploitation des Procédés George Claude, Paris (FR)

( * ) Notice: Subject to any disclaimer, the term of this patent is extended or adjusted under 35 U.S.C. 154(b) by 18 days.

(21) Appl. No.: 18/379,569

(22) Filed: Oct. 12, 2023

(65) Prior Publication Data

US 2024/0124246 A1     Apr. 18, 2024

(30) Foreign Application Priority Data

Oct. 13, 2022    (ES) ............................... ES202230879

(51) Int. Cl.
*B65G 47/04*        (2006.01)
*A23B 2/80*        (2025.01)
(Continued)

(52) U.S. Cl.
CPC ............. *B65G 47/04* (2013.01); *A23B 2/803* (2025.01); *A23B 2/88* (2025.01); *F25D 25/04* (2013.01); *B65G 2201/0202* (2013.01)

(58) Field of Classification Search
None
See application file for complete search history.

(56) References Cited

U.S. PATENT DOCUMENTS 5,813,518 A *  9/1998  Kirker .................... B65G 21/10
                                                          198/817
6,273,241 B1 *  8/2001  Bonnet .................. B65G 15/02
                                                          198/781.09
(Continued)

FOREIGN PATENT DOCUMENTS

CN        105236164        1/2016
CN        108 967 814        12/2018
(Continued)

OTHER PUBLICATIONS

Spanish Search Report for ES 202230879, mailed Feb. 2, 2023.

*Primary Examiner* — Kavel Singh
(74) *Attorney, Agent, or Firm* — Yan Jiang

(57) ABSTRACT

The present invention relates to a distribution system and an item of equipment for treatment of solid material that comprises same, wherein said distribution system comprises a means for transmitting movement that is configured to generate a rotating movement; a distribution element comprising a surface parallel to the feeding means on which at least one rod is arranged, perpendicularly, configured to come into contact with the solid material to be treated; a rotating means which connects the means for transmitting movement to the distribution element, configured to generate a rocking or circular movement; and a means for supporting the distribution element; wherein a first end of the distribution element comprises a means for joining to the rotating means, situated on an axis eccentric to the axis of rotation of said rotating means, and a second end, opposite to the first end, is accommodated on the supporting means.

8 Claims, 3 Drawing Sheets

(51) Int. Cl.
    *A23B 2/88*          (2025.01)
    *F25D 25/04*      (2006.01)

(56)                References Cited

U.S. PATENT DOCUMENTS 9,611,060 B2 *    4/2017   Yoshikane  .............. B31B 70/04
9,833,014 B2    12/2017   Chang et al.

FOREIGN PATENT DOCUMENTS

| | | |
|---|---|---|
| CN | 109 405 510 | 3/2019 |
| CN | 109 654 862 | 4/2019 |
| CN | 110340006 | 10/2019 |
| CN | 111703808 | 9/2020 |
| CN | 112 050 561 | 12/2020 |
| CN | 112061821 | 12/2020 |
| CN | 113 262 977 | 8/2021 |
| ES | 2883255 T3 | 12/2021 |
| WO | WO 2020 228862 | 11/2020 |

* cited by examiner

DISTRIBUTION SYSTEM FOR AN ITEM OF EQUIPMENT FOR TREATMENT OF SOLID MATERIAL AND ITEM OF EQUIPMENT FOR TREATMENT OF SOLID MATERIAL

CROSS-REFERENCE TO RELATED APPLICATIONS

This application claims the benefit of priority under 35 U.S.C. § 119 (a) and (b) to Spanish patent application No. ES 202230879, filed Oct. 13, 2022, the entire contents of which are incorporated herein by reference.

FIELD OF THE INVENTION

The present invention relates to equipment for treatment of a solid bulk material. Specifically, the present invention relates to a system for the distribution of product that is adaptable to an item of treatment equipment, such as, for example, refrigeration systems used in the food industry.

PRIOR ART

A solid material can be defined as any body that, owing to the high cohesion of its molecules, maintains a constant form and volume. Unlike fluids, they do not have the ability to flow and tend towards the shape of the container in which they are housed.

There are many occasions when it is necessary to treat bulk solid material. These treatments are very important, for example, in the food industry. In this industry, there are numerous processes where a treatment of solid elements is required, for example: the refrigeration thereof, which requires that said treatment is carried out in a homogeneous and individualized manner. In this respect, refrigeration processes, processes where the temperature is lowered, also comprise freezing processes where the state of the liquid phase of a product is changed to the solid phase due to the effect of lowering the temperature.

The loading of the material into an item of treatment equipment continuously can be carried out through the use of different devices that make appropriate use of the surface of the conveyor belt, such as vibrating tables, retractable belts or other equipment intended for this purpose. However, due to the inability to flow, in many cases this loading cannot be carried out effectively, creating accumulations at certain points on the conveyor belt.

In the case of cryogenic equipment, where it is necessary to carry out the freezing of the product, this accumulation causes:

1. A difference in the degree of freezing between different elements;
2. Non-individualized freezing of the product by adhesion;
3. Loss of production since more dwell time is needed to achieve full freezing.

Currently, in the cryogenization market, there is an alternative item of equipment which comprises an element that is configured so as to allow the individualization of the products during freezing, by means of a wave-like movement of the conveyor belt. This solution solves the problems of the lack of distribution of the products to be treated across the equipment, since the wave-like movements allow the products to be distributed on the belt, giving rise to a more homogeneous treatment of the products.

However, the problems described for the cryogenization process, such as the lack of homogeneity and individualization of the process, can be generalized to other treatments of a solid material. For example, a correct distribution of the product is also required for drying processes for a homogeneous result of the treatment, washing, metering, as well as other treatments of bulk products.

On the other hand, the document ES2883255T3 describes an apparatus for the treatment of a particulate material, which comprises a set of plates for the distribution of a gas below the conveyor belt, giving rise to a fluidized flow of the particulate material which allows a homogeneous and individualized treatment.

Consequently, there is a need for equipment for the treatment of bulk solid material, both in the food sector and in other sectors, which allows a homogeneous and individualized treatment of the product.

With the object of overcoming the limitations reported in the prior art, a new system for distribution of a solid material is proposed.

SUMMARY

In a first aspect, the present invention relates to a distribution system of an item of equipment for treatment of a solid material, which comprises a feeding means (for example a conveyor belt) on which the solid material to be treated is arranged.

The present invention is based on the displacement and dispersion of the solid material to be treated on the surface of the feeding means which conveys same, by means of the contact with a distribution element, in the manner of a comb, situated generally along the width of said feeding means.

The system described in the present invention can be adapted to an item of equipment for treatment of bulk solid material, for example a refrigeration tunnel. This type of equipment is used for the refrigeration and/or freezing of the bulk solid material. As set forth above, this type of equipment is widely used in the food industry and comprises a feeding means, such as a conveyor belt, and a treatment means, intended to carry out the desired treatment.

In one particular case, if a freezing treatment is desired, the treatment means is that intended for that purpose. In this way, the treatment means may comprise a system for providing liquid refrigerant, which, in contact with the solid material, causes the latter to freeze.

The system described in the present invention does not require any additional motors or other equivalent equipment to cause the movement of the distribution element, since it can make use of the movement of the feeding means itself that is used in the product treatment equipment.

Therefore, the system of the present invention comprises:

A means for transmitting movement;
A rotating means;
A distribution element;
A means for supporting the distribution element.

The means for transmitting movement is a means that can be adapted to said feeding means, for example a conveyor belt of a refrigeration tunnel. Said means is configured to generate a rotating movement perpendicular to the direction of displacement of the feeding means.

The rotating means connects the means for transmitting movement to the distribution element. This rotating means is configured to generate a movement, whether a rocking or circular movement, in the distribution element parallel to the surface of the feeding means.

The distribution element is configured to separate the products to be treated on the surface of the feeding means. This distribution element comprises a surface on which at least one rod is arranged, in a descending manner, preferably perpendicularly to the direction of the feeding means. Said rod is configured to come into contact with the product to be treated, at least with the head of the rod, avoiding the agglomeration of the products during the feeding thereof, and dispersing them over the surface of the feeding means, allowing a homogeneous and individualized treatment.

A first end of the distribution element is joined to the rotating means via a joining means. This joining means connects the distribution element to the rotating means at an axis eccentric to the axis of rotation of said rotating means. Thus, thanks to the rotation of the rotating means caused by the means for transmitting movement, the distribution element is displaced, describing a rocking or circular movement.

In addition, the distribution element comprises a second end, opposite the first end, which is connected to the supporting means. As well as supporting the distribution element in a manner parallel to the surface of the feeding means on which the solid material to be treated is arranged, the second end may have alternative configurations, as a function of the movement chosen for the distribution element. In this respect, the displacement of said element may be carried out via two alternatives:

Rocking movement, preferably straight or transverse to the movement of the belt that conveys the product;

Circular movement on the belt that conveys the product.

The difference between the two movements is based on the means for joining the distribution element to the rotating means and the connection thereof to the supporting means.

In a second aspect of the invention, the present invention describes an item of equipment for treatment of solid material which comprises at least one distribution system. Unlike other solutions existing in the known prior art, said equipment provides a homogeneous and individualized treatment, thanks to the presence of at least one distribution system as described above. This system may have different configurations in the equipment according to the needs required at each point of the treatment.

By way of example, in a freezing treatment, a first zone can be identified, where the freezing of the solid material begins, and subsequently a second zone can be identified, where the refrigerant fluid is provided. Consequently, the system may have a first configuration at the entry to the refrigeration tunnel, where the freezing begins, and a second configuration, which is different from the first, in that zone where the refrigerant fluid for the parts is introduced.

Therefore, unlike the known prior art, the present invention relates to a distribution system and an item of equipment for treatment of solid material that comprises said system, which improves the process for treatment of a solid material, allowing an individual treatment with greater homogeneity on each of the products treated, avoiding the agglomeration of said solid material. In addition, this involves a device which allows an improvement to current equipment, without the need to modify the principal functioning thereof, as occurs with alternative solutions where the displacement of the solid material is carried out by means of a wave-like movement of the conveyor belt.

The following elements are shown in the figures:
1. Distribution system
2. Means for transmitting movement
3. Pinion
4. First axis of rotation
5. 90° gearbox
6. Second axis of rotation
7. Rotating means

4

8. Eccentric axis
9. Distribution element
10. Distribution shaft
11. Perforation in the distribution element
12. Rod
13. First end
14. Joining means
15. Connecting rod
16. Second end
17. Supporting means
18. Treatment equipment
19. Entry of the equipment
20. Exit of the equipment
21. Feeding means
22. Refrigeration means
23. Head of the rod
24. Fan Throughout the description and the claims, the word "comprises" and its variants is not intended to exclude other technical features, components or steps. In addition, the word "comprises" includes the case of "consists of". For persons skilled in the art, other objects, advantages and features of the invention will emerge in part from the description and in part from the execution of the invention. The following examples and drawings are provided by way of illustration, and they are not intended to limit the present invention. In addition, the present invention covers all of the possible combinations of particular and preferred embodiments indicated here.

DETAILED DESCRIPTION OF THE INVENTION

Figure 1:
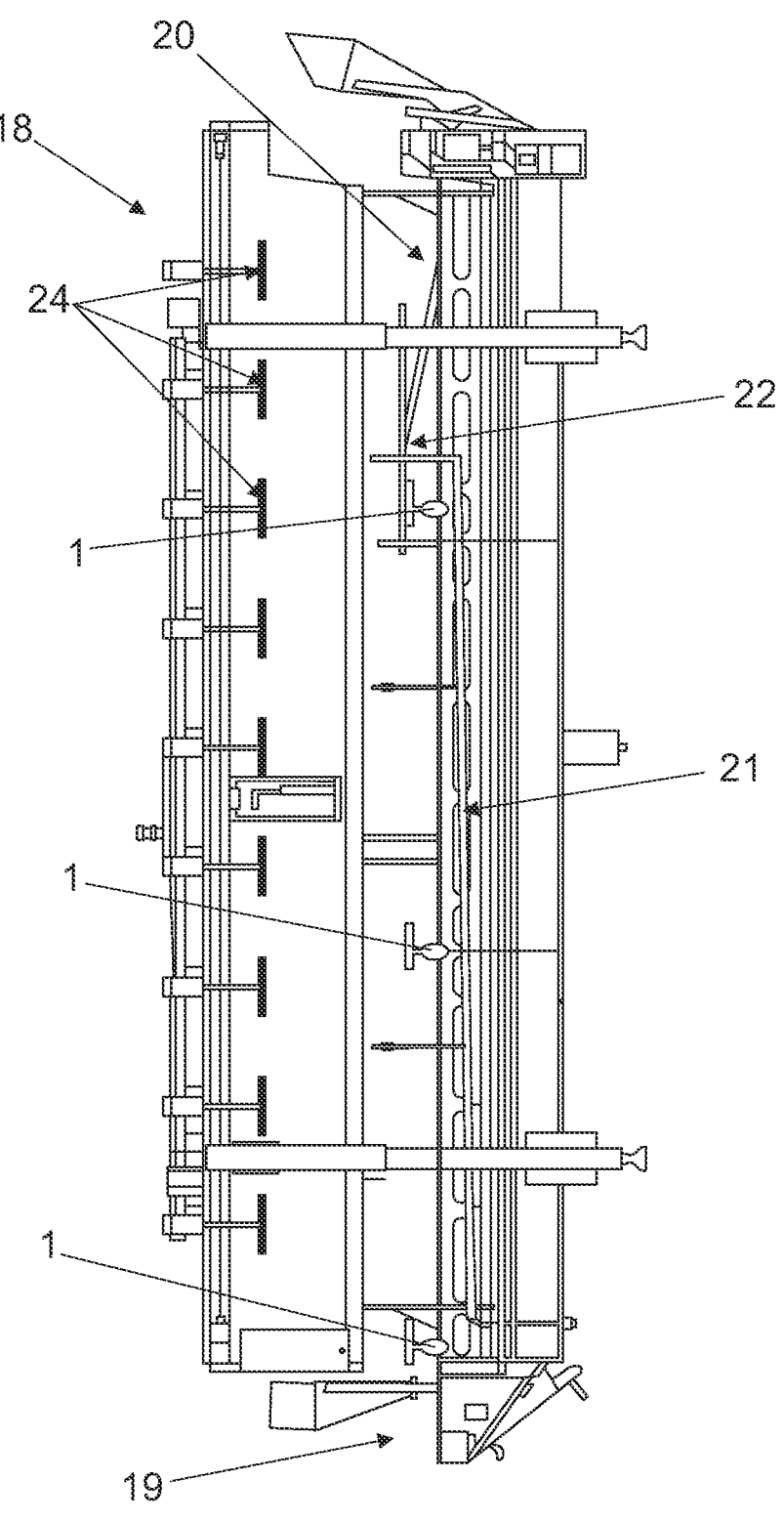
FIG. 1 shows a cross section of an item of treatment equipment, specifically an item of refrigeration equipment, which comprises three distribution systems.

FIG. 1 shows a cross section of an item of treatment equipment (18), specifically an item of refrigeration equipment. Said item of treatment equipment comprises three distribution systems (1).

As can be seen, the treatment equipment (18) has an entry (19) and an exit (20), connected by a feeding means (21). This feeding means (21) is configured to convey a solid material, arranged on the surface of said feeding means (21).

Specifically, the treatment equipment (18) shown in FIG. 1 is an item of refrigeration equipment comprising a refrigeration means (22), forming a refrigeration tunnel. On this occasion, the refrigeration means (22) is arranged in the upper part, although in other embodiments it may be situated to the side of the feeding means (21), consisting of a means for spraying a refrigerant fluid onto the solid material and a set of fans.

Among the different embodiments of continuous refrigeration equipment, a very frequent configuration is that in which the refrigerant fluid circulates in counter-current with the material to be refrigerated and/or frozen after distribution thereof by the refrigeration means (22). In this configuration, the temperature gradient between the refrigerant fluid and the solid material to be treated is maximized. The solid material, loaded onto the feeding means (21), for example a conveyor belt, is at its maximum temperature at the entry (19) of the refrigeration equipment, and due to contact with the refrigerant fluid, loses temperature as it advances along the equipment.

The contact between the solid material and the refrigerant fluid is maximized with the use of at least one fan (24). Said fans (24) push the cold refrigerant fluid against the hot material. The more extended this product on the conveyor belt, the more efficient the heat transfer, hence a suitable distribution of the material on the belt, avoiding any accumulation.

The solid material extended over the feeding means (21) offers only some parts of its surface upon contact with the refrigerant fluid, with others remaining impeded as a result of the contact thereof with the feeding means (21) itself or with other material parts. The transfer of heat between the refrigerant fluid and these "hidden" zones of the material is impossible, which means that homogeneous distribution of the temperature on the material is not achieved, the refrigeration process is slowed down and the energy efficiency of the operation is reduced.

One particular case is the process for freezing of a solid material with moisture on the surface thereof. Said moisture causes the adhesion of the different parts joined by the ice formed between them, which makes individualization of the material parts impossible.

As a result, the presence of at least one distribution system (1) like that described in the present invention achieves a movement of the solid material such that it offers all or the majority of its surface, solving the drawbacks detailed above.

In an item of refrigeration equipment in counter-current and specifically in those which use a cryogenic fluid as refrigerating agent, the material is irrigated with this fluid at its minimum temperature, whether in liquid or solid phase ($CO_2$), the time at which the material cedes part of its heat to produce the gasification of these fluids. It is very important for the process that the larger surface of the material comes into contact with the fluid so that the heat transfer is produced equally over the entire surface of the material. The change in position of the material facilitates this operation.

Although the functioning in a refrigeration tunnel in counter-current has been detailed, the same problems of accumulation, homogeneity of the material, elimination of "dark" zones in the solid material, increase in operating efficiency also arise in many other types of treatment equipment (18) where processes are carried out such as refrigeration in environments at constant temperature (spiral tunnels), refrigeration equipment in co-current, heating processes, washing processes, metering of other products, etc. In an obvious manner, each of the items of treatment equipment (18) has a treatment means, replacing the refrigeration means of the embodiment shown in FIG. 1, which is specific to the process carried out in said treatment equipment (18).

Therefore, as described above, an item of treatment equipment (18) may comprise at least one distribution system (1). By way of example, FIG. 1 shows an item of refrigeration equipment having three distribution systems (1), with a first distribution system (1) arranged in the entry of the treatment equipment (18), whose main function is the distribution of the solid material. On the other hand, the following two distribution systems (1) are situated in contact with the distribution of the refrigerant fluid.

The at least one distribution system (1) may comprise a distribution element (9) with long and short rods (12). The use of short rods (12) is preferred at the entry (19), promoting a homogeneous distribution of the product load on the surface of the feeding means (21) while avoiding accumulations and unoccupied zones. Then, the use of a distribution element (9) with long rods allows the position of the solid material to be treated to be changed. In this way, the existence of hidden zones during the treatment of said material is reduced. Furthermore, systems with a rocking movement can also be combined with systems that cause a circular movement on the feeding means (21).

As a more favourable embodiment, there is presented an item of treatment equipment (18) having at least one distribution system (1) having short rods (12) at the entry (19) of the equipment (18), and at least one distribution system (1) having long rods (12) at a distance from the entry (19), avoiding adhesion between the solid material and generating the change in position of the product.

In a freezing method, the adhesion phenomenon is produced when the individual parts of the product to be treated start to freeze superficially, which would impede individual freezing. In the zones for injection of cryogenic liquid, the use of devices with long rods (12) is preferred for achieving greater homogeneity in the wetting of the product parts with the cryogenic liquid.

Figures 2, 3:
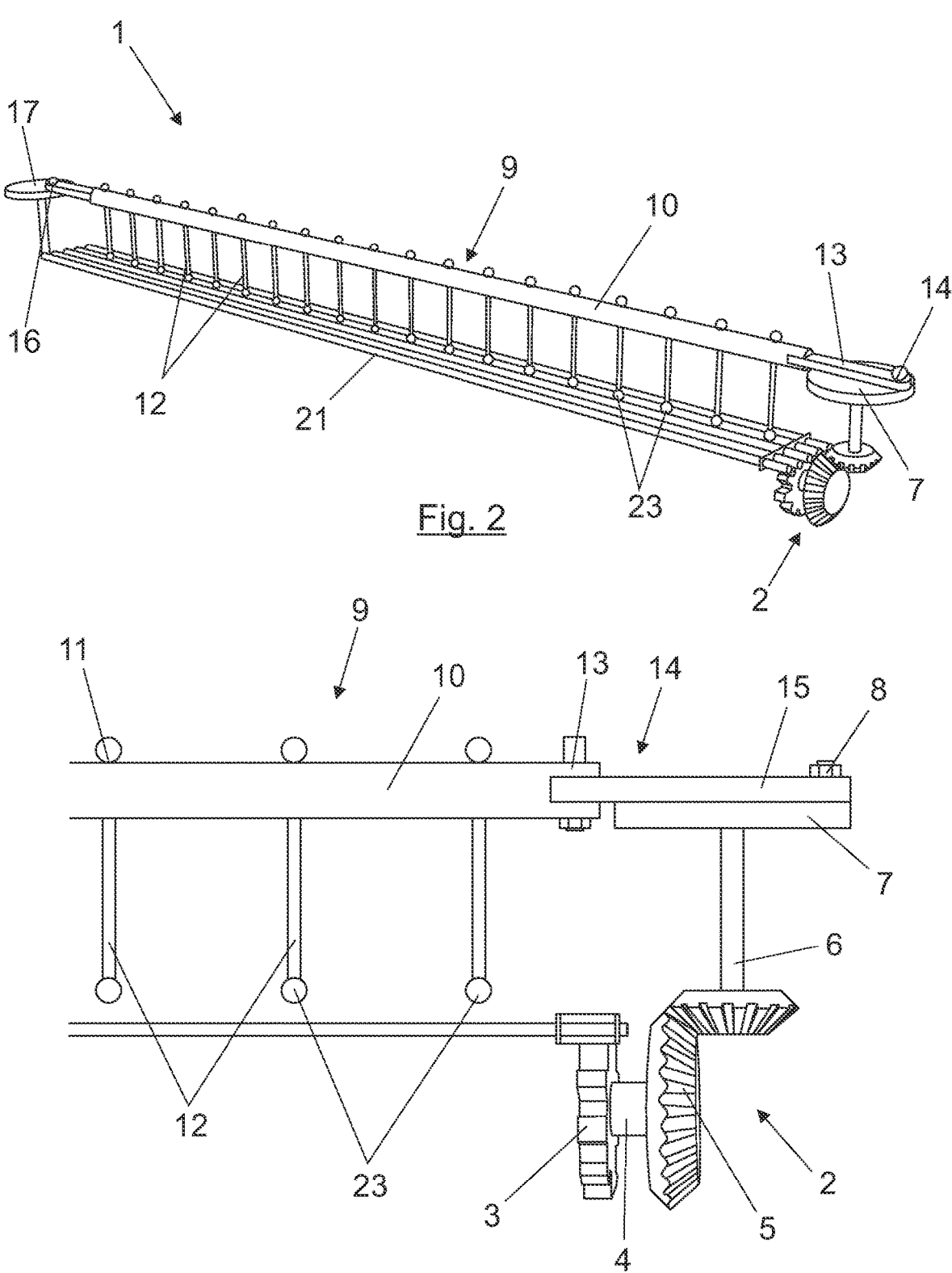
FIG. 2 shows a perspective view of an embodiment of a distribution system with a circular movement.
FIG. 3 shows a perspective view of an embodiment of a means for transmitting movement which is connected to a distribution shaft.

FIG. 2 shows a perspective view of an embodiment of a distribution system (1) having a circular movement.

In this FIG. 2, an embodiment is shown of a distribution system (1) for an item of equipment (18) for treatment of a solid material which comprises a feeding means (21). This solid material, arranged on the surface thereof, comes into contact with the head (23) of at least one rod (12), arranged in a manner perpendicular to the surface of the feeding means (21) and is displaced on the surface of said feeding means (21).

As can be seen in FIG. 2, at least one rod (12) descends from a distribution element (9). Said distribution element (9) has a surface arranged in parallel to said feeding means (21). As can be seen in FIG. 2, the surface may be in the form of a bar or distribution shaft (10) which covers all of the distance of the feeding means (21) perpendicular to the feeding direction thereof.

In a preferred embodiment, the surface of the distribution element (9) is perforated. In turn, the distribution element (9) comprises a regulator for the rods (12). In this way, the perforation of the distribution element (9) and the presence of a regulator for the rods (12) allows the rods (12) of the present invention to be adjusted in terms of height, the height of interaction being chosen with the solid material to be treated and defining the height up to which the solid material can accumulate.

The distribution element (9) is connected and/or supported by a first and a second end (13, 16). In this way, a first end (13) of the distribution element (9) comprises a means (14) for joining to a rotating means (7), wherein the joining is established on an axis eccentric (8) to the rotation shaft of said rotating means (7). On the other hand, a second end (16), opposite the first end (13), is accommodated in a supporting means (17).

This rotating means (7) is responsible for connecting the distribution element (9) to a means (2) for transmitting movement, which can be adapted to the movement of the feeding means.

The means (2) for transmitting movement is responsible for starting the movement of the distribution system (1). However, since this is a means (2) that can be adapted to the feeding means (21), it does not require the use of an external motor. The actual displacement of the feeding means (21) is that used to cause the movement of the system (1).

For its part, the supporting means (17) for the distribution element (9) can have different configurations, according to the movement to be described by the rods. Thus, in the present embodiment, the supporting means (17) is a means configured to rotate in a manner similar to the rotating means. Since the distribution element (9) has rigid ends, the rocking movement described by the surface of the distribution element (9), generated by the rotating means (7), is a circular movement, which translates into a circular path of the head (23) of the at least one rod (12).

For greater clarification, FIG. 3 shows a perspective view of an embodiment of a means (2) for transmitting movement which is connected to a distribution shaft (10).

Specifically, in FIG. 2, a means (2) for transmitting movement is shown, which comprises a pinion (3), which is adapted to a feeding means (21), in this particular case in the form of a grill structure. This pinion (3) rotates as the feeding means (21) moves, making a first axis of rotation (4) rotate.

This first axis of rotation (4) is connected to a 90° gearbox (5) which transmits the movement to a second axis of rotation (6). This second axis (6) has a rotation perpendicular to the rotation of the first axis (4) as well as to the direction of displacement of the feeding means (21).

In this alternative embodiment, the gearbox is a conical 90° gearbox (5) formed by toothed gears, although any other means that achieves a rotational movement perpendicular to the displacement of the feeding means (21) could be used, on which said means (2) for transmitting movement is adapted.

The second axis of rotation (6) is joined to a rotating means (7), for example in the form of a rotating plate. This rotating means (7) connects the means (2) for transmitting movement to the distribution element (9). Unlike the second axis of rotation (6), the rotating means (7) is configured to generate a rocking or circular movement parallel to the surface of the feeding means (21) of the distribution element (9). To do this, a rotating means (21) in the form of a plate has at least one eccentric axis, where the distribution element (9) can be joined.

In the particular embodiment shown in FIG. 3, the distribution element (9) is embodied in the form of a shaft, comprising an articulated connection means (14) at a first end (14).

Unlike the alternative with a rigid connecting means (14) (FIG. 2), which describes a circular movement, the articulated connecting means (14) comprises a connecting rod (15) configured to articulate the first end (13) of the distribution element (9). The size and position of the eccentric connection determine the rocking movement carried out by the distribution element (9) on the surface of the feeding means (21).

This connecting rod (15), situated eccentrically with respect to the axis of rotation of the rotating means (7), can be supplemented with a hollow supporting means (17), configured to house the second end (16) of the distribution element (9). When the second end (16) is inserted into the hollow supporting means (17), the displacement of the surface of the distribution element (9) is limited at the entry and exit of said second end (16) in a linear manner.

As a result, as an alternative to the circular movement of the distribution element (9), a distribution element that describes a movement that is rocking, linear and transverse to the displacement of the feeding means is also acceptable.

In this embodiment, an embodiment of a distribution element (9) is shown in the form of a bar or distribution shaft (10) that is perforated multiple times. A rod (12) is arranged in each of the perforations (11) of said shaft (10), giving rise to the set of rods that will come into contact with the solid material to be treated.

The number and spacing of the rods (12) of a distribution element (9) can be adjusted in line with the needs of the treatment equipment (18) used. In the same way, the distribution of the rods (12) on the surface of the distribution element (9) can also be adjusted, from a unidirectional distribution, with a linearly operating shaft, to a distribution along a plane. The existence of multiple alternative embodiments makes it possible to adjust the distribution according to the needs of the treatment equipment (18).

In addition to the adjustment of the height of the rod (12), the perforation (11) may have a certain clearance. This clearance of the perforations (11) allows each of the rods (12) to be adjusted individually in the vertical direction, which makes it possible to protect the system (1) from possible variations in the surface of the feeding means (21), returning to its original position after overcoming the difference in level.

Thus, a rod (12) that rests on the feeding means (21) principally encourages the movement of the product. As noted above, this translates into a great advantage with respect to solutions known in the prior art, since it avoids the adhesion of the solid material to itself at the time of treatment and avoids subjecting the entirety of the product to similar conditions along the treatment equipment, thereby guaranteeing homogeneous characteristics of the product at the exit of the treatment equipment (18).

Given that the system (1) can be used in the food industry, for example in a refrigeration process, the head (23) of said rod (12) is preferably made of a material that is compatible with foods. Furthermore, said head (23) may be rounded, which allows improved treatment of the solid material to be treated, since it protects the integrity of said products.

The speed and extent of the rocking movement may be adjusted by modifying the relationship between the means (2) for transmitting movement, for example, by modifying the teeth of the pinion (3) or the 90° gearbox (5), and/or the position of the eccentric axis used by the rotating means.

Figure 4:
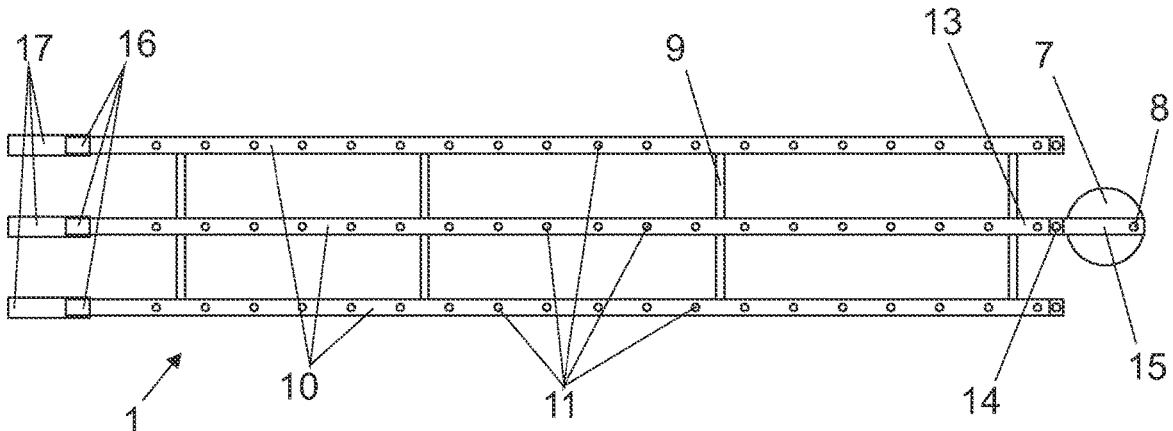
FIG. 4 shows a plan view of an embodiment of a system having three shafts with linear movement.
Figure 5:
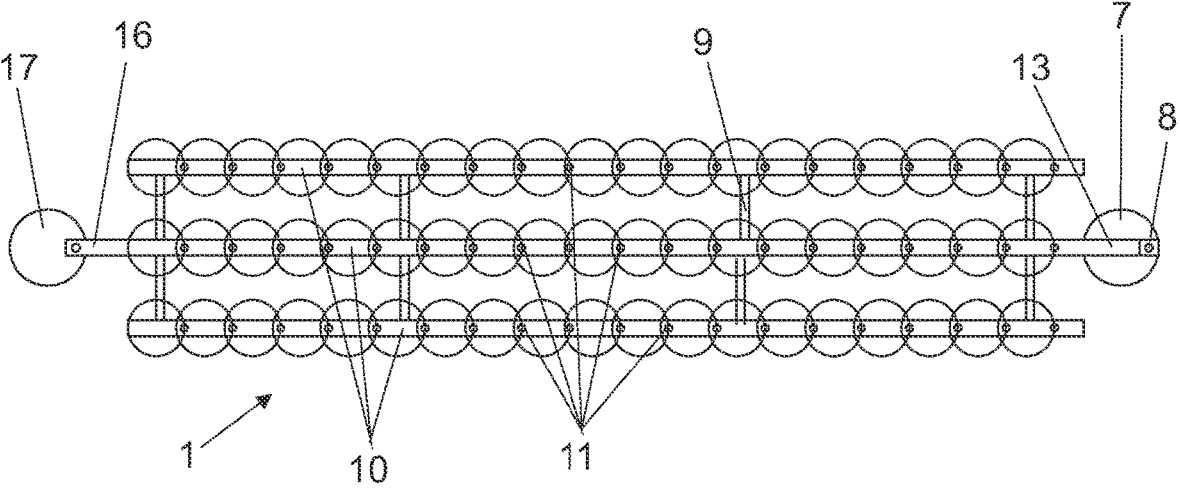
FIG. 5 shows a plan view of an embodiment of a system having three shafts with a circular movement.

Lastly, in FIG. 4 and FIG. 5, a configuration of a distribution system having three distribution shafts (10) is shown.

Moreover, FIG. 4 shows a plan view of an embodiment of a system (1) having three distribution shafts (10) with linear movement. On this occasion, a rotating means (7) can be seen, which is joined to a first end (13) of the distribution element (9), by means of a joining means (14) which comprises a connecting rod (15). On the other hand, the second end (16) may have multiple embodiments. Thus, said end (16) comprises at least one termination connected to said supporting means (17). As shown in FIG. 4, a configuration that has a number of terminations is acceptable, for example: three adjustable terminations on a supporting means (17) configured according to said embodiment.

As has been described above, the articulation present on this first end (13), together with a hollow supporting means (17) at the second end (16) of the distribution element (9), defines a linear movement of the rods (12) present along said distribution element (9).

For its part, FIG. 5 shows a plan view of an embodiment of a system having three shafts with a circular movement. In this embodiment, a rigid distribution element (9) is shown which is joined at a first end and a second end (13, 16) to a rotating means (7) and to a supporting means (17), respectively. In other words, the distribution element (9) is not articulated.

On this occasion, unlike the alternative in which a linear movement is described, the supporting means (17) is configured to rotate in the same way as the rotating means (7). In this way, each of the rods (12) of the distribution element (9) describe a circular movement.

In the embodiments described in FIG. 4 and FIG. 5, a configuration is shown in which the perforations (11) existing in the distribution element (9) form a grid.

However, other alternative embodiments of the present invention may be carried out with other configurations or patterns, such as for example in a staggered configuration.

As a result, in a first aspect of the solution proposed in the present invention, a distribution system (1) is described which provides a distribution of the solid material, occupying the maximum extent on a feeding means (21) of an item of treatment equipment (18). For its part, in a second aspect of the invention, the treatment equipment (19) comprising said distribution system (1) is described. In this way, agglomerations of the solid material to be treated are avoided and a homogeneous and individualized treatment is achieved, resulting in an improvement to this kind of process.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

The invention claimed is:

1. A distribution system for an item of equipment for treatment of a solid material, comprising a feeding means with a surface on which the solid material is arranged, the distribution system comprising:
   a) a means for transmitting movement, which can be adapted to a feeding means and is actuated by said feeding means, configured to generate a rotating movement perpendicular to the plane of displacement of the feeding means, wherein the feeding means is a conveyor belt;
   b) a distribution element comprising a surface parallel to the plane of displacement of the feeding means on which at least one rod is arranged, perpendicularly, with a head that is configured to come into contact with the solid material to be treated;
   c) a rotating means which connects the means for transmitting movement to the distribution element, configured to generate a rocking or circular movement parallel to the surface of the feeding means; and
   d) a supporting means for the distribution element;
   wherein a first end of the distribution element comprises a joining means to the rotating means, situated on an axis eccentric to the axis of rotation of said rotating means, and a second end, opposite the first end, is accommodated in the supporting means,
   wherein the distribution element is a perforated element, wherein each perforation houses a rod,
   wherein each rod is vertically displaceable, passing through the perforation in the distribution element.

2. The distribution system of claim 1, wherein the means for transmitting movement comprises a 90° gearbox, which is connected to the feeding means.

3. The distribution system of claim 1, wherein the rotating means is a rotating plate.

4. The distribution system of claim 1, wherein the distribution element comprises at least one distribution shaft where the at least one rod is arranged.

5. The distribution system of claim 1, wherein the joining means of the distribution element comprises a connecting rod, configured to articulate the first end of the distribution element.

6. The distribution system of claim 1, wherein the supporting means of the distribution element is configured to rotate in the same way as the rotating means.

7. The distribution system of claim 6, wherein the supporting means of the distribution element comprises at least one hollow means configured to house the second end of the distribution element and to fix a rocking movement of the distribution element.

8. An item of equipment for treatment of solid material, comprising a feeding means with a surface on which the solid material is arranged, wherein the item comprises at least one distribution system of claim 1, coupled to the feeding means.

* * * * *